United States Patent [19]

Wilson

[11] Patent Number: 4,623,171
[45] Date of Patent: Nov. 18, 1986

[54] NO-MORTAR FLASHING METHOD AND APPARATUS

[76] Inventor: James H. Wilson, 7225 W. Marine Dr., Milwaukee, Wis. 53223

[21] Appl. No.: 579,364

[22] Filed: Feb. 13, 1984

[51] Int. Cl.$^4$ .............................. F16L 41/08
[52] U.S. Cl. ....................... 285/42; 285/158; 285/189; 285/210; 285/206; 285/208; 285/194; 285/161; 411/347; 29/456; 126/314
[58] Field of Search .............. 285/161, 158, 194, 208, 285/205, 206, 189, 42, 43, 44, 192, 203, 201, 210; 411/340, 341, 342, 347, 349, 350; 98/58, 60; 126/314, 317, 318; 29/453, 456, 157 R

[56] References Cited

U.S. PATENT DOCUMENTS

| | | | |
|---|---|---|---|
| 221,827 | 11/1879 | Johnston | 411/340 X |
| 222,242 | 12/1879 | Cambell | 126/314 |
| 249,103 | 11/1881 | Schafer | 285/206 X |
| 594,526 | 11/1897 | Glauber | 285/210 |
| 651,483 | 6/1900 | Greenfield | 29/456 |
| 693,234 | 2/1902 | Choate | 126/317 |
| 757,641 | 4/1904 | Saunders | 285/210 |
| 906,870 | 12/1908 | Grabel | 285/158 X |
| 1,275,922 | 8/1918 | Holt | 285/42 |
| 1,391,396 | 9/1921 | McMurtrie | 137/216 |
| 1,586,888 | 6/1926 | Elmen | 29/456 |
| 2,088,410 | 7/1937 | Everson | 137/21 |
| 2,374,489 | 4/1945 | Lalande | 126/314 |
| 2,472,569 | 6/1949 | Caldwell et al. | 285/210 |
| 2,508,476 | 5/1950 | Steiner | 285/201 |
| 2,509,563 | 5/1950 | Grashow | 250/33 X |
| 2,518,426 | 8/1950 | Kinander | 285/203 |
| 2,733,067 | 1/1956 | Moore et al. | 29/453 |
| 3,078,109 | 2/1963 | Jackson et al. | 285/158 X |
| 3,092,175 | 6/1963 | Suessle | 29/453 |
| 3,155,106 | 11/1964 | Baron | 137/216 |
| 3,226,135 | 12/1965 | Epstein | 285/41 X |
| 3,276,021 | 9/1966 | Horndasch | 343/715 X |
| 3,745,632 | 7/1973 | Malkki et al. | 29/157 R |
| 3,749,424 | 7/1973 | Greene | 285/161 |
| 4,123,093 | 10/1978 | Newland | 285/189 |
| 4,251,094 | 2/1981 | Pinto | 29/157 R |
| 4,306,738 | 12/1981 | Lindquist | 285/4 |
| 4,337,564 | 7/1982 | Menzel et al. | 29/453 |
| 4,495,997 | 1/1985 | Scott et al. | 166/242 |

FOREIGN PATENT DOCUMENTS 379465  9/1932  United Kingdom ................ 29/188

Primary Examiner—Cornelius J. Husar
Assistant Examiner—Eric K. Nicholson

[57] ABSTRACT

A vent pipe extension and flashing apparatus for extending a vent pipe into a chimney including a generally vertical wall having an interior surface, an exterior surface, and an opening through the wall. The apparatus comprises a threaded sheet metal pipe including helical threads extending along substantially the entire length of the outer surface of the threaded pipe, the threaded pipe having opposite first and second ends, the first end being adapted to extend through the opening in the chimney wall, the second end being adapted to be connected to a vent pipe. The apparatus also comprises restraining means for engaging the interior surface of the wall to prevent the threaded pipe from being pulled back through the opening, the restraining means being supported by the first end of the threaded pipe and being compressible to allow the first end of the threaded pipe to be pushed through the opening in the wall. The apparatus further comprises means for surrounding the second end of the pipe and engaging the exterior surface of the wall to cover the opening and including a member adapted to be threaded onto the second end of the threaded pipe.

5 Claims, 11 Drawing Figures

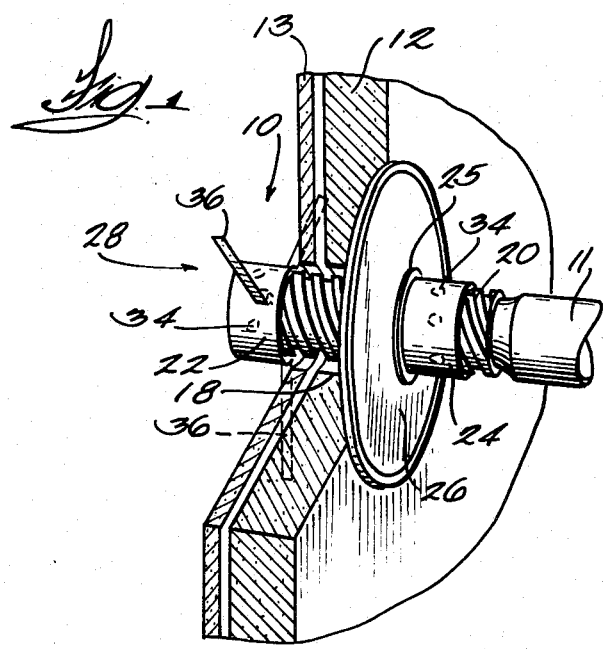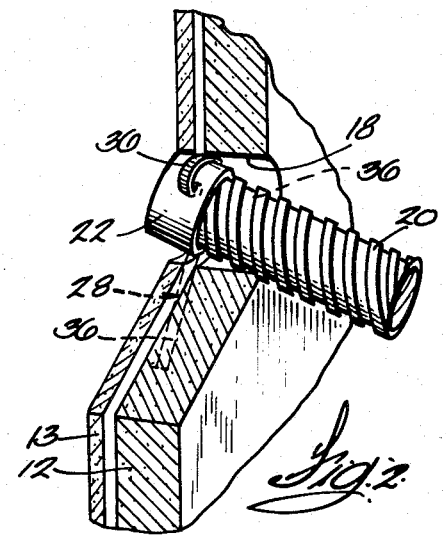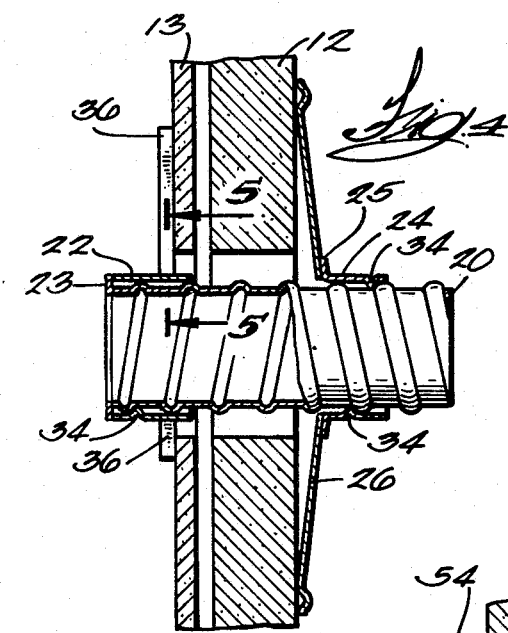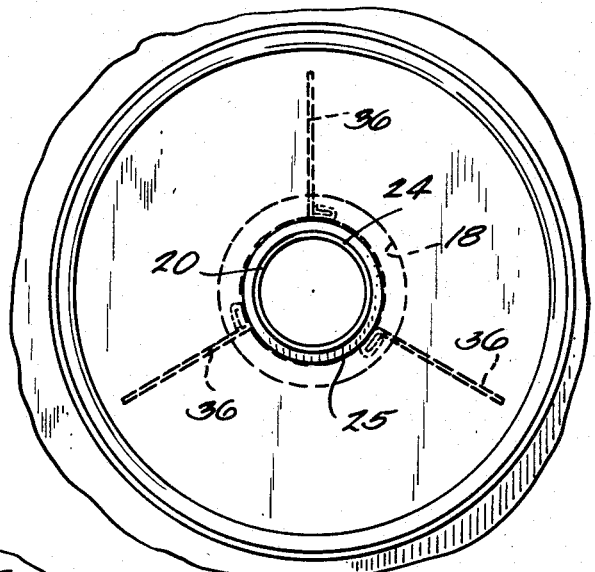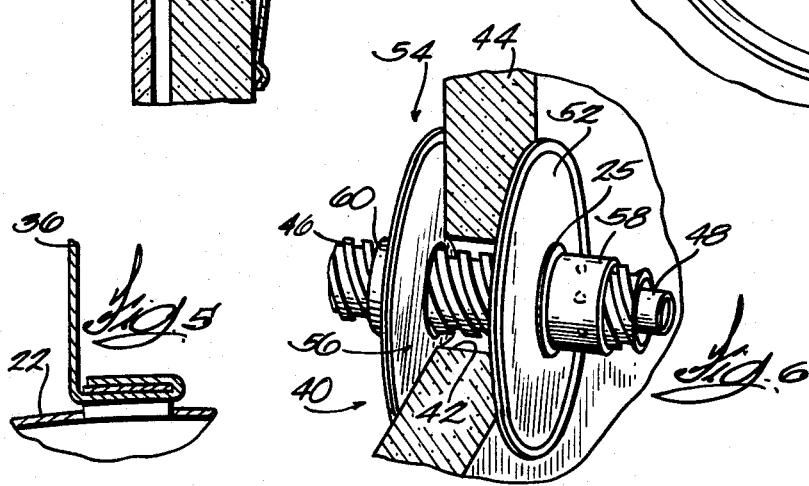

NO-MORTAR FLASHING METHOD AND APPARATUS

BACKGROUND OF THE INVENTION

The invention relates to apparatus for extending vent pipes through chimney walls and for extending pipes through walls.

Prior methods or apparatus for extending a pipe through a brick wall include the use of mortar or caulking around the pipe. Disadvantages inherent in the use of mortar are that skill is required to cement the pipe in place, and that it takes a long time for the mortar to set up and harden. Another disadvantage of mortar is that it falls out from cracking and deterioration. Similar disadvantages are present with the use of caulking.

When installing a pipe with mortar where a larger pipe has already been cemented in place, the old pipe and mortar must be removed before the smaller pipe can be installed, in order to provide a suitable surface to which the new mortar may attach. This takes time.

An additional problem is presented when extending a heated pipe through a wall, especially when the wall is constructed of wood or other combustible materials. The wall must be insulated from the pipe in order to prevent burning or melting of the wall. Prior methods for insulating such a pipe include wrapping the pipe with insulating material.

Attention is also directed to applicant's U.S. Pat. No. 4,437,687, issued Mar. 20, 1984.

SUMMARY OF THE INVENTION

The invention provides a vent pipe extension and flashing apparatus for extending a vent pipe into a chimney including a generally vertical wall having an interior surface, an exterior surface, and an opening through a wall. The apparatus comprises a threaded sheet metal pipe including an outer surface, opposite first and second ends, and helical threads extending along substantially the entire length of the outer surface of the threaded pipe, the first end being adapted to extend through the opening in the chimney wall, the second end being adapted to be connected to a vent pipe. The apparatus also comprises a first collar adapted to be threaded onto the first end of the threaded pipe, and restraining means for engaging the interior surface of the wall to prevent the threaded pipe and the first collar from being pulled back through the opening, the restraining means being fixed to the first collar and being compressible to allow the first end of the threaded pipe and the first collar to be pushed through the opening in the wall. The apparatus further comprises a flange adapted to surround the threaded pipe adjacent to the second end and adapted to surround the opening and to engage the exterior surface of the wall, and a second collar adapted to be threaded onto the second end of the threaded pipe to engage the flange for securing the flange against the exterior surface of the wall.

In one embodiment, the restraining means includes a plurality of restraining members supported by the first collar, the restraining members being movable between a first position wherein the first collar and the first end of the threaded pipe can be pushed through the opening in the chimney wall, and a second position wherein the restraining members engage the interior surface of the chimney wall when the first collar and the first end have been pushed through the opening to restrain the first collar and the threaded pipe from being pulled back through the opening.

In one embodiment, the threaded sheet metal pipe is formed from an elongated strip of sheet metal having spaced parallel longitudinal edges, the elongated strip of sheet metal being rolled in a helical pattern to form a pipe with the elongated strip defining a plurality of side-by-side abutting coils of sheet metal, and with the abutting longitudinal edges of the coils being joined together to form a seam, the seam forming a helical thread extending along the length of the pipe.

In one embodiment, the threads are further defined by a helical ridge formed on the sheet metal pipe and extending along the length of the pipe.

The invention also provides a method for making a vent pipe extension and flashing apparatus including a sheet metal pipe having an external helical thread formed integrally in the sheet metal pipe, the sheet metal pipe being adapted to extend through an opening in a wall and to be connected to a vent pipe. The method comprises the steps of: providing an elongated strip of sheet metal having spaced parallel longitudinal edges, rolling the strip of sheet metal in a helical pattern to form a pipe with the strip of sheet metal defining a plurality of side-by-side abutting coils of sheet metal, joining together the longitudinal edges of the abutting coils to form a seam, the seam forming a helical thread extending along the length of the pipe, providing restraining means for engaging the interior surface of the wall to prevent the pipe from being pulled back through the opening, the restraining means being supported by one end of the threaded pipe and being compressible to allow the one end of the pipe to be pushed through the opening in the wall, and providing means for surrounding the threaded pipe and engaging the exterior surface of the wall to cover the opening, said surrounding means including a member adapted to be threaded out the other end of the pipe.

In one embodiment, the method further comprises the step of forming a helical ridge on the sheet metal along the entire length of the pipe.

The invention also provides an apparatus for extending a pipe through an opening in a wall having opposite first and second generally flat surfaces. The apparatus comprises a threaded sheet metal pipe adapted to extend through the opening in the wall, the threaded sheet metal pipe having an outer surface and first and second opposite ends and including helical threads extending along substantially the entire length of the outer surface. The apparatus further comprises a second sheet metal pipe housed in the threaded sheet metal pipe, the second pipe having a diameter smaller than the diameter of the threaded pipe and being housed centrally in the threaded pipe so as to define a space between the second pipe and the threaded pipe, the second pipe including opposite ends, one of the opposite ends being adapted to be joined to the pipe to be extended through the wall. The apparatus also comprises a flange adapted to surround the threaded sheet metal pipe adjacent to the first end and adapted to surround the opening and to engage the first surface of the wall, and restraining means for surrounding the threaded pipe adjacent to the second end and for engaging the second surface of the wall to cover the opening. The apparatus further comprises a first collar adapted to be threaded onto the first end of the threaded pipe and to be engaged against the flange for securing the flange against the first surface of the wall, and a second collar adapted to be threaded onto the second end of the threaded pipe and to be engaged against the restraining means for securing the restraining means against the second surface of the wall.

In one embodiment, the apparatus further includes a spacer positioned between the threaded pipe and the second pipe, the spacer maintaining a space between the threaded pipe and the second pipe.

In one embodiment, the spacer is heat resistant.

A principal feature of the invention is that it provides an apparatus that requires very little time or skill to install, because the user does not need to apply mortar or caulking.

Another principal feature of the invention is that no tools, and no additional materials, such as mortar or caulking, are necessary for installation.

Another principal feature of the invention is that it will not wear out, whereas mortar tends to fall out from cracking and deterioration.

Another principal feature of the invention is that it is adaptable to wall openings of various sizes. The opening can be substantially larger than the pipe to be extended through the wall.

Another principal feature of the invention is that it allows a smaller pipe to be inserted through a bigger pipe which already extends through a wall, without having to remove the old pipe and mortar. When installing a new pipe with mortar, it is necessary to remove the old pipe and mortar in order to provide a suitable surface to which the new mortar may attach.

Another principal feature of the invention is that the pipe being extended into the chimney cannot be inserted too far or not far enough into the chimney.

Another principal feature of the invention is that it provides an apparatus for extending a heated pipe through a wall without requiring insulation.

Another principal feature of the invention is that it provides a simple method for making a vent pipe extension and flashing apparatus.

Other features and advantages of the invention will become apparent to those skilled in the art upon review of the following detailed description, claims, and drawings.

DESCRIPTION OF THE DRAWINGS

FIG. 1 is a perspective view of an apparatus embodying the invention extending into a chimney through a wall which has been cut away.

FIG. 2 shows the restraining means of the apparatus of FIG. 1 being pushed through the opening in the wall.

FIG. 3 is an end view of the apparatus of FIG. 1.

FIG. 4 is a cross-section view of the apparatus of FIG. 1 extending through the wall.

FIG. 5 is an enlarged cross-section view taken along line 5—5 in FIG. 4.

FIG. 6 is a perspective view of an apparatus which is an alternative embodiment of the invention.

Figure 8:
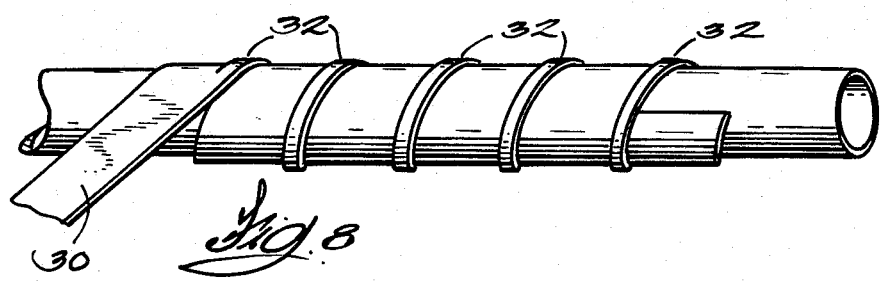
FIG. 8 shows a threaded sheet metal pipe being made according to the method of the invention.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is a vent pipe extension and flashing apparatus 10 embodying the invention. The apparatus 10 is adapted to extend a vent pipe 11 into a chimney including a chimney flue 13 having an interior surface, a generally vertical wall 12 having an exterior surface, and an opening 18 through the wall 12 and the chimney flue 13. It should be understood that the apparatus 10 could also be extended into a chimney having only a vertical wall with interior and exterior surfaces.

Figure 9:
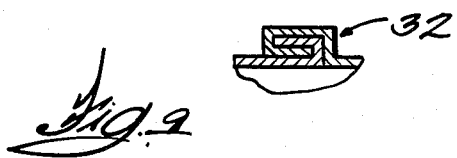
FIG. 9 is an enlarged cross-section view of the seam formed by the method of the invention illustrated in FIG. 8.

The apparatus 10 comprises a threaded sheet metal pipe 20 having a helical thread extending along substantially the entire length of the outer surface of the threaded pipe 20. In the preferred embodiment, the threaded sheet metal pipe 20 is made according to the method of the invention, as illustrated in FIG. 8. The threaded sheet metal pipe 20 comprises an elongated strip 30 of sheet metal rolled in a helical pattern to form a pipe with the elongated strip 30 defining a plurality of side-by-side abutting coils of sheet metal, and with the abutting longitudinal edges of the coils being joined together to form a seam 32, the seam 32 forming the helical thread. A cross-sectional view of the seam 30 formed by the method is shown in FIG. 9. The apparatus for use in forming the sheet metal pipe 20 from an elongated strip of sheet metal, and wherein the edges of the coils of sheet metal are joined together in the manner illustrated in FIG. 9 to form a seam and a thread, is conventional and can comprise a Model 2002 SR Automatic Tube Former sold by Spiro American Inc., Wheeling, Ill.

Figure 10:
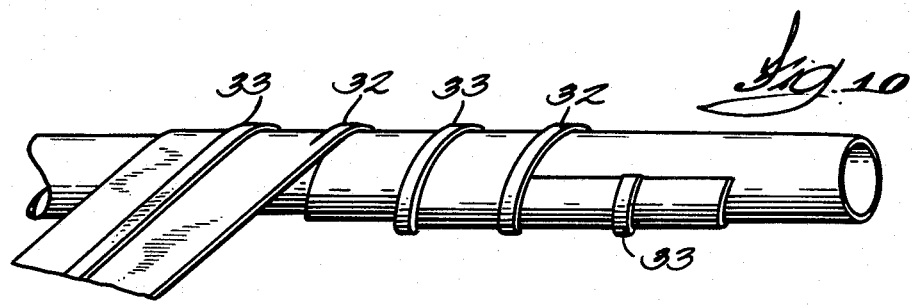
FIG. 10 shows a threaded sheet metal pipe being made according to an alternative embodiment of the method of the invention.
Figure 11:
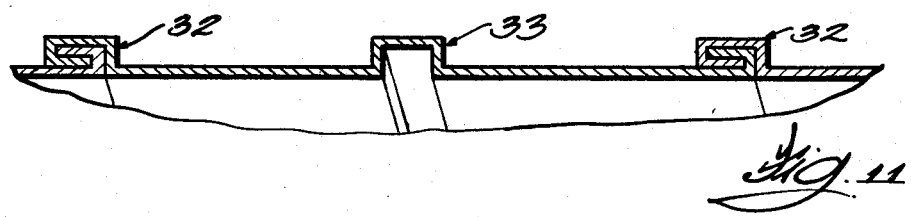
FIG. 11 shows an enlarged cross-section view of the threaded sheet metal pipe formed by the alternative method of FIG. 10.

In an alternative embodiment of the method for forming the threaded sheet metal pipe 20, as illustrated in FIG. 10, additional threads could be formed by forming a helical ridge 33 on the sheet metal pipe 20 along the entire length of the pipe 20. A cross-sectional view of the threads formed by this method is shown in FIG. 11.

The first end of the threaded sheet metal pipe 20 is adapted to extend through the opening 18 in the chimney wall 12 and the chimney flue 13, as shown in FIG. 1, and the second end is adapted to be connected to a vent pipe 11.

The apparatus 10 also comprises a first collar 22 adapted to be threaded onto the first end of the threaded pipe 20. The first collar 22 is an annular piece of metal having an inside diameter which is substantially equal to the outside diameter of the threaded sheet metal pipe 20. As illustrated in FIG. 1, the first collar 22 includes a plurality of indentations 34 therein for engaging the threads of the threaded pipe 20 so that the first collar 22 may be threaded onto the threaded pipe 20 and will remain secured thereto.

In the illustrated construction, the first end of the threaded sheet metal pipe 20 has a lip 23 thereon, as best shown in FIG. 4, so that the first collar 22 cannot come off of the pipe 20 after the apparatus 10 is installed (to be described hereinafter).

The apparatus 10 also comprises restraining means 28 fixed to the first collar 22 and being compressible to allow the first end of the threaded pipe 20 and the first collar 22 to be pushed through the opening 18. The restraining means 28 thereafter engage the interior surface of the chimney flue 13 to prevent the threaded pipe 20 and the first collar 22 from being pulled back through the opening 18.

While various suitable restraining means 28 could be employed for this purpose, in the illustrated construction, the restraining means 28 includes a plurality of flexible fingers 36 supported by the first collar 22. These flexible fingers 36 could be made, for example, of spring steel. FIG. 5 shows the manner in which the flexible fingers 36 of the preferred embodiment are attached to a saber cut in the first collar 22. The flexible fingers 36 are bendable between a first position wherein the first collar 22 and the first end of the threaded pipe 20 can be pushed through the opening 18, as shown in FIG. 2, and a second position wherein the flexible fingers 36 are fully extended. In this second position, after the first collar 22 and the first end of the threaded pipe 20 have been pushed through the opening 18, the flexible fingers 36 engage the interior surface of the chimney flue 13 to prevent the first collar 22 and the threaded pipe 20 from being pulled back through the opening 18, as shown in FIG. 1. Because of the length of the flexible fingers 36, they will be effective even in an opening 18 that is substantially larger than the pipe to be extended through the wall 12.

It should be understood that the restraining means 28 could be fixed directly to the first end of the threaded pipe 20, rather than being fixed to a collar (here the first collar 22 ) which threads onto the pipe 20.

The apparatus 10 also comprises a flange 26 adapted to surround the threaded pipe 20 adjacent to the second end and adapted to surround the opening 18 and to engage the exterior surface of the wall 12. As best shown in FIG. 4, the flange 26 is dish-shaped so that the flange 26 can abut the exterior surface of the wall 12 while fitting over the end of an old pipe or old mortar extending from the wall 12 around the opening 18. The outer diameter of the flange 26 is substantially greater than the outer diameter of the pipe 20 so that the flange 26 will cover a large opening 18. As shown in FIG. 3, the flange 26 has a circular opening in the center thereof which has a diameter substantially equal to the outer diameter of the threaded sheet metal pipe 20 so that the flange 26 will fit snuggly over the pipe 20. Because of the construction of the flange 26, as described above, the apparatus 10 can be installed in an opening 18 which is substantially larger than the pipe 20, or it can be installed through an old pipe, so that it is not necessary to remove the old pipe, as was necessary with the prior art.

The apparatus 10 further comprises a second collar 24 adapted to be threaded onto the second end of the threaded pipe 20 to engage the flange 26 for securing the flange 26 against the exterior surface of the wall 12. Like the first collar 22, the second collar 24 is an annular piece of metal having an inside diameter which is substantially equal to the outside diameter of the threaded sheet metal pipe 20, and the second collar 24 includes a plurality of indentations 34 similar to those of the first collar 22 and serving the same function. The second collar 24 also includes an angled lip 25 on the edge adapted to engage the flange 26. The lip 25 causes the flange 26 to be centered with respect to the second collar 24 and the pipe 20.

It should be understood that while in this preferred embodiment the flange 26 is secured against the wall by the second collar 24, the flange 26 could itself be threaded onto the pipe 20 to secure itself against the wall, thereby eliminating the need for the second collar 24.

To install the apparatus 10, the first step is to screw the first collar 22 and the attached flexible fingers 36 onto the first end of the threaded pipe 20. Because of the lip 23 on the first end of the pipe 20, the first collar 22 must be threaded onto the pipe 20 from the second end thereof. The next step is to extend the first collar 22 and the first end of the threaded pipe 20 through the opening 18, as shown in FIG. 2. When the first collar 22 has passed completely through the opening 18, the fexible fingers 36 will extend outwardly and engage the interior surface of the chimney flue 13, to prevent the threaded pipe 20 and the first collar 22 from being pulled back through the opening 18. The next step is to slip the flange 26 over the second end of the threaded pipe 20 to engage the wall 12, as best shown in FIG. 4. The next step is to screw the second collar 24 onto the second end of the threaded pipe 20 until the second collar 24 engages the flange 26 and secures it tightly against the exterior surface of the wall 12. The next step is to attach the vent pipe 11 to the second end of the threaded sheet metal pipe 20.

Because of the simple construction of the apparatus 10, very little time or skill is required for installation. No tools or other materials are needed. Because all of the parts of the apparatus 10 are made of metal, the apparatus 10 will not wear out.

Illustrated in FIG. 6 is an alternative embodiment of the invention. The apparatus 40 of FIG. 6 is adapted to extend a pipe, and more particularly a heated pipe, through an opening 42 in a wall 44. The alternative apparatus 40 is similar to the first apparatus 10, but the alternative apparatus 40 has a slightly different construction because it is adapted to be used on a wall having two accessible sides.

The alternative apparatus 40 comprises a threaded sheet metal pipe 46 adapted to extend through the opening 42 in the wall 44, as showm in FIG. 6. In the preferred embodiment, the threaded sheet metal pipe 46 of the alternative apparatus 40 is identical to the threaded sheet metal pipe 20 of the first apparatus 10.

The apparatus 40 also comprises a second sheet metal pipe 48 housed in the threaded sheet metal pipe 46, the second pipe 48 having a diameter smaller than the diameter of the threaded pipe 46 and being housed centrally therein so as to define a space between the second pipe 48 and the threaded pipe 46. The second pipe 48 includes opposite ends, one of the opposite ends being adapted to be joined to the pipe to be extended through the wall 44.

Figure 7:
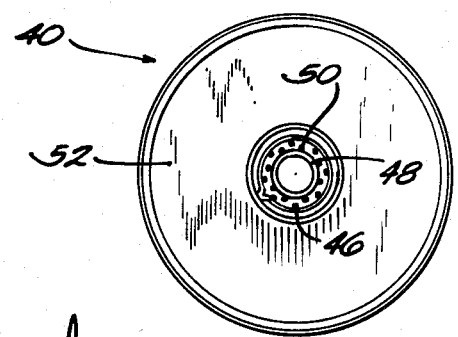
FIG. 7 is an end view of the apparatus of FIG. 6.

The apparatus 40 further includes a pair of spacers 50 positioned between the pipes 46 and 48 and longitudinally spaced along the second pipe 48. The spacers 50 are heat resistant and maintain a space between the threaded pipe 46 and the second pipe 48. A spacer 50 is best shown in FIG. 7. When the pipe being extended through the wall 44 is a heated pipe, the second pipe 48 and the spacers 50 prevent heating of the threaded pipe 46 which might result in burning of a wall made of combustible material. No insulation is needed.

In the preferred embodiment, the spacers 50 are rings of perforated metal. The perforations allow airflow between the pipes 46 and 48 so that the threaded pipe 46 does not become heated.

The apparatus 40 further comprises a flange 52 adapted to surround the threaded sheet metal pipe 46 adjacent to the first end of the pipe and adapted to surround the opening 42 and to engage the first surface of the wall 44. In the illustrated construction, the flange 52 is identical to the flange 26 of the first apparatus 10.

The apparatus 40 further comprises restraining means 54 adapted to surround the threaded pipe 46 adjacent to the second end of the pipe 46 and adapted to surround the opening 42 and to engage the second surface of the wall 44. While various suitable means 54 could be employed for this purpose, in the illustrated construction, the restraining means 54 comprises another flange 56.

The apparatus 40 further comprises a first collar 58 adapted to be threaded onto the first end of the threaded pipe 46 and to be engaged against the flange 52 for securing the flange 52 against the first surface of the wall 44, and a second collar 60 adapted to be threaded onto the second end of the threaded pipe 46 and to be engaged against the restraining means 54 for securing restraining means 54 against the second surface of the wall 44. In the preferred embodiment, these first and second collars 58 and 60 are identical to the first and second collars 22 and 24 of the first apparatus 10.

It should be understood that this alternative apparatus 40 could also be constructed by adding the second pipe 48 and the spacers 50 to the apparatus 10 that was previously described.

Various features of the invention are set forth in the following claims.

I claim:

1. A vent pipe extension and flashing apparatus for extending a vent pipe through an opening in a wall having an interior surface and an exterior surface, the apparatus comprising
   a threaded sheet metal pipe including an outer surface, opposite first and second ends, said first end being adapted to extend through the opening in the wall, and said second end being adapted to be connected to a vent pipe,
   restraining means for engaging the interior surface of the wall to prevent said threaded pipe from being pulled back through the opening, said restraining means being supported by said first end of said threaded pipe and being compressible to allow said first end of said threaded pipe to be pushed through the opening in the wall, said restraining means including a first collar adapted to be threaded onto said first end of said threaded pipe, and a plurality of restraining members supported by said first collar and adapted to extend radially outwardly from said first collar, said restraining members being flexible between a first position wherein said restraining members and said first collar threaded onto said first end of said threaded pipe can be pushed through the opening in the wall, and a second position wherein said restraining members extend radially outwardly from said collar to engage the interior surface of the wall when said first collar and said first end have been pushed through the opening to restrain said first collar and said threaded pipe from being pulled back through the opening, and
   means for surrounding said second end of said threaded sheet metal pipe and engaging the exterior surface of the wall to cover the opening, said surrounding means including a member adapted to be threaded onto said second end of said threaded pipe, said means for surrounding including a flange adapted to surround said threaded pipe adjacent to said second end and adapted to cover the opening and to engage the exterior surface of the wall, said flange being slideably movable along the length of said pipe, and wherein said member adapted to be threaded onto said second end of said threaded pipe comprises a collar adapted to be threaded onto said second end of said threaded pipe and adapted to engage said flange for forcing said flange against the exterior surface of the wall.

2. An apparatus as set forth in claim 1 wherein said threaded sheet metal pipe is formed from an elongated strip of sheet metal having spaced parallel longitudinal edges, said elongated strip of sheet metal being rolled in a helical pattern to form a pipe with said elongated strip defining a plurality of side-by-side abutting coils of sheet metal, and with the abutting longitudinal edges of said coils being joined together to form a seam, said seam forming a helical thread extending along the length of said pipe.

3. A method for making a vent pipe extension and flashing apparatus including a sheet metal pipe having an external helical thread formed integrally in the sheet metal pipe, the sheet metal pipe being adapted to extend through an opening in a wall and to be connected to a vent pipe, said method comprising the steps of:
   providing an elongated strip of sheet metal having spaced parallel longitudinal edges,
   rolling the strip of sheet metal in a helical pattern to form a pipe with the strip of sheet metal defining a plurality of side-by-side abutting coils of sheet metal,
   joining together the longitudinal edges of the abutting coils to form a seam, the seam forming a helical thread extending along the length of the pipe,
   threading a restraining means onto one end of said length of pipe, the restraining means being provided for engaging the interior surface of the wall to prevent the pipe from being pulled back through the opening, said restraining means being threaded onto one end of the threaded pipe and being compressible to allow the restraining means and the one end of the pipe to be pushed through an opening in the wall, and
   sliding a flange onto an opposite end of the length of threaded pipe, the flange being adapted to surround the threaded pipe and for engaging the exterior surface of the wall to cover the opening, and
   threading a collar onto said opposite end of the length of threaded pipe, the collar being functional to engage the flange to force the flange against the exterior surface of the wall.

4. A method as set forth in claim 3 wherein said joining together step further comprises bending both of the abutting longitudinal edges of the abutting coils transversely to the coils so that the edges are parallel and abutting and so as to form a flange, and folding over the flange so that the folded over flange engages one of the abutting coils.

5. A method as set forth in claim 3 wherein said method further comprises the step of forming a helical ridge on the sheet metal pipe along the entire length of the pipe.

* * * * *